United States Patent [19]

Winterbottom

[11] 4,361,594
[45] Nov. 30, 1982

[54] PROCESS FOR ADVANCING ETHERIFIED AMINOPLAST RESINS WITH A GUANAMINE

[75] Inventor: Kenneth Winterbottom, Whittlesford, England

[73] Assignee: Ciba-Geigy Corporation, Ardsley, N.Y.

[21] Appl. No.: 187,699

[22] Filed: Sep. 16, 1980

[30] Foreign Application Priority Data

Sep. 27, 1979 [GB] United Kingdom ............... 7933501

[51] Int. Cl.$^3$ ............................................. B05D 1/04
[52] U.S. Cl. ................................... 427/27; 427/195; 427/388.3; 427/386; 427/389.7; 525/162; 525/163; 525/443; 525/509; 525/510
[58] Field of Search .............. 260/29.4 R; 528/258, 528/259, 254; 427/27, 388.3, 386, 389.7, 195; 525/509

[56] References Cited

U.S. PATENT DOCUMENTS

| | | | |
|---|---|---|---|
| 3,082,190 | 3/1963 | Boldizar | 260/67.6 |
| 3,454,529 | 7/1969 | Casebolt | 528/258 |
| 3,515,697 | 6/1970 | Miwa et al. | 528/258 |
| 3,922,447 | 11/1975 | Isaksen et al. | 428/474 |
| 4,143,016 | 3/1979 | Hönel et al. | 260/29.4 R |
| 4,217,377 | 8/1980 | Shay et al. | 525/441 |

FOREIGN PATENT DOCUMENTS 1026696  4/1966  United Kingdom .
1108889  4/1968  United Kingdom .
1181691  2/1970  United Kingdom .

OTHER PUBLICATIONS

Chem. Abstracts, vol. 87, (1977), 40238m.
Chem. Abstracts, vol. 72, (1970), 56331n.
Chem. Abstracts, vol. 77, (1972), 7422n.
Chem. Abstracts, vol. 80, (1974), 27676p.
Chem. Abstracts, vol. 81, (1974), 153588v.
Chem. Abstracts, vol. 90, (1979), 7053m.

*Primary Examiner*—Theodore Pertilla
*Attorney, Agent, or Firm*—Luther A. R. Hall

[57] ABSTRACT

Advanced, etherified aminoplast resins containing one or more guanamine residues are prepared by heating, at a pH of from 2.5 to 9, an etherified methylolated urea, cyclic urea, carbamate or melamine such as methylated methylolated urea, ethyleneurea, or propyleneurea with a guanamine, such as benzoguanamine or acetoguanamine. The products may be heated with resins containing at least two alcoholic hydroxyl, carboxylic acid, or carboxylic acid amide groups per molecule to form hard, crosslinked materials. They are particularly useful in forming surface coatings.

9 Claims, No Drawings

PROCESS FOR ADVANCING ETHERIFIED AMINOPLAST RESINS WITH A GUANAMINE

BACKGROUND OF THE INVENTION

This invention relates to a novel process for preparing certain aminoplast resins, more particularly, advanced etherified aminoplast resins containing one or more guanamine residues, to the resins made by the new process, and to their use in coating compositions.

Etherified aminoplast resins are, in general, well known, commercially-available materials and are used in numerous fields of application, especially in liquid or powder coating compositions. They are prepared by reacting an amido compound with an aqueous solution of formaldehyde or with a formaldehyde donor, e.g., paraform, under neutral or basic conditions to form the methylolated amido compound, i.e., the aminoplast, and etherifying this with an alkanol under acid conditions. Such materials are often blended with an alcoholic hydroxyl group-containing resin, such as an alkyd, polyester, or acrylic resin, and cured at elevated temperatures in the presence of an acid catalyst, or, when larger proportions of an acid catalyst are used, at room temperature. Epoxide resins of higher molecular weight which contain alcoholic hydroxyl groups as well as epoxy groups are also used. Other resins employed as the coreactant are carboxyl-containing or carboxylic acid amide-containing resins.

For certain applications, such as in the formulation of powder coatings, it is highly desirable that the etherified aminoplast resin be a non-sticky solid at room temperature or at slightly elevated temperatures. Many commercially-available etherified aminoplast resins are sticky, highly viscous liquids at ordinary temperatures, and so cannot be used in powder coatings.

Further, it is known that the compatibility of etherified aminoplast resins with a range of coreactants and solvents is dependent, to a large extent, on the nature of the etherifying group. When the etherifying group is derived from a lower alkanol, particularly methanol, good compatibility may not always be achieved.

We have now found a novel method of making etherified aminoplast resins which are solid at ambient and moderately elevated temperatures and which are fully compatible with a wide range of coreactants and solvents.

It is known, from British Patent Specification No. 948,853, to prepare a modified aminoplast resinous composition by i. forming a partially polymerised aminotriazine resin comprising an aldehyde, especially formaldehyde, and an aminotriazine, which is usually melamine but may be a guanamine, ii. adding a small amount of an aminotriazine to the partially polymerised aminoplast resin (which is unetherified), iii. heating the resulting syrup for a short period, and iv. cooling the hot syrup, and then blending therewith a small amount of one or more amines.

The product is used alone to form laminates from glasscloth.

British Patent Specification No. 1,048,710 describes the reaction of benzoguanamine and formaldehyde to form a monomeric reaction product which is then treated with melamine and a polymerisation catalyst is added. The product is likewise unetherified.

British Patent Specification No. 1,141,972 describes the reaction of a methylolated melamine with acetoguanamine and a toluenesulphonamide to give a product suitable for mouldings and laminates, having good reforming properties and cracking resistance. In the aforesaid specification, for purposes of comparison, a product is described which was prepared from methylolated melamine and acetoguanamine only, and this product was shown to be unsuitable as a laminating resin as it was unmouldable or gave a poor surface glaze. This product, like the others mentioned in the Specification, was unetherified.

In the process now provided, an etherified, methylolated urea, cyclic urea, carbamate, or melamine is heated with, as advancing agent, a monomeric guanamine, under mildly acid to mildly basic conditions. The term "advancement" in its various forms is used herein in its conventional sense to refer to a process in which a substantially uncrosslinked product of higher molecular weight is produced.

SUMMARY OF THE INVENTION

Accordingly, this invention provides a process for the preparation of an advanced etherified aminoplast resin which comprises reaction, at a pH of from 2.5 to 9, of (a) an etherified N-methylolated urea, cyclic urea, carbamate, or melamine, having the formula I, II or III $$ROCH_2N(R^2)-R^1-N(R^3)CH_2OR \qquad I$$

$$[(ROCH_2)_mN(H)_p-COO]_nR^4 \qquad II$$

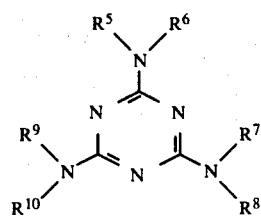

III where

R represents a hydrogen atom or an alkyl group of 1 to 6 carbon atoms, with the proviso that at least 50% of the symbols R in the groups —CH$_2$OR in every compound of formula I, II, and III represent such alkyl groups, R$^1$ represents a carbonyl group, in which case R$^2$ and R$^3$ (which may be the same or different) each represents a hydrogen atom or a group of formula ROCH$_2$—, or together they represent an alkylene chain of 2 to 4 carbon atoms which may be substituted by 1 or 2 hydroxyl groups and by 1 to 4 alkyl groups each of up to 5 carbon atoms, or R$^1$ represents a methylene or ethylene group, in which case R$^2$ and R$^3$ each represents a group of formula —COOR$^{11}$, n either represents 1, in which case p represents zero, m represents 2, and R$^4$ represents an alkyl group of 1 to 18 carbon atoms which may be substituted by 1 or 2 hydroxyl groups or by an alkoxy group of from 1 to 5 carbon atoms, or n represents 2, in which case p represents zero and m represents 2, or p and m each represents 1, and R$^4$ represents an alkylene group of 1 to 6 carbon atoms or an arylene group of 6 to 12 carbon atoms, $R^5$ to $R^{10}$, which may be the same or different, each represents a hydrogen atom or a group of formula —$CH_2OR$, with the proviso that not more than 4 of them represent hydrogen atoms, and $R^{11}$ represents an alkyl group of up to 18 carbon atoms which may be substituted by 1 or 2 hydroxyl groups or by an alkoxy group of from 1 to 5 carbon atoms, with (b) a guanamine of formula

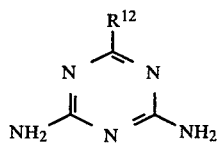
IV where $R^{12}$ represents an alkyl or aralkyl group of from 1 to 18 carbon atoms, an aryl group of 6 to 8 carbon atoms, or a group of formula

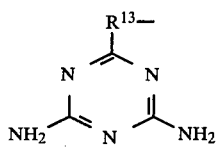
V and $R^{13}$ represents an alkylene group of from 2 to 16 carbon atoms or a phenylene group, wherein 0.05 to 1 gram equivalent of guanamine residue of component (b) is used per mole of component (a).

If $R^{12}$ represents an alkyl or aralkyl group, it has preferably 1 to 12 carbon atoms.

If $R^{13}$ represents an alkylene group, it has preferably 2 to 6 carbon atoms.

DESCRIPTION OF THE PREFERRED EMBODIMENTS

This advancement is preferably carried out in the presence of an acid catalyst, particularly at a pH of 3 to 6. Acids which may be used as the catalyst include formic acid, phosphoric acid, and aromatic sulfonic acids, such as benzenesulfonic acid and especially toluene-p-sulfonic acid. The amount of etherified methylolated compound of formula I, II, or III and the reaction conditions may be varied according to the physical properties sought in the final product, more of this compound and a longer reaction time generally leading to higher molecular weight materials, these having higher melting temperature ranges. Preferably, the reaction is effected with 0.1 to 0.7 gram equivalent of guanamine residue of component (b) per mole of component (a). Preferably, too, the reaction mixture is heated at from 80° to 140° C. for from 2 to 6 hours. It may be heated in the presence or absence of a solvent. The product may be purified by removal of solvent if present and, if desired, by removal of any acid catalyst using conventional methods. Often, however, it is sufficient to neutralise the acid with a tertiary amide, since the salt does not usually interfere with, and may indeed help, the later curing reactions. The product preferably has a softening point within the range of 50° to 150° C., especially within the range 60° to 120° C.

The etherified methylolated compounds of formulae I, II, and III used as starting materials for the novel process are, in general, known materials.

They are normally prepared by reaction of 1 mole of an amido compound, viz., melamine, urea, a cyclic urea, or a carbamate of formula VI or VII

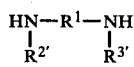
VI

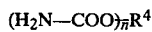
VII wherein $R^1$, $R^4$, and n are as hereinbefore defined, and $R^{2'}$ and $R^{3'}$ have the same significance as $R^2$ and $R^3$ respectively, but do not represent a group —$CH_2OH$ or —$CH_2OR$, where R is as hereinbefore defined, with at least 0.3 mole of formaldehyde per replaceable hydrogen atom on the amido group, subject to there being at least two moles of formaldehyde per mole of the amido compound, under alkaline conditions, the methylolation being substantially complete in ¼ to 4 hours at 50° to 100° C. The mixture is then treated with at least 2 moles, per mole of the amido compound, of a saturated monohydric alcohol having from 1 to 6 carbon atoms. An excess of the alcohol is preferred, this excess serving as a solvent for the reaction. The mixture is usually acidified using a strong acid, such as hydrochloric acid, which is preferably added in an amount sufficient to reduce the pH to within the range 1.5 to 4, and the reaction is carried out at any temperature from 20° C. to the boiling temperature of the mixture.

The reactant of formula IV as component (b) may, for example, be adipoguanamine, succinoguanamine, caprinoguanamine (i.e., $R^{12}$ in formula IV denotes $CH_3(CH_2)_8$—), benzoguanamine, acetoguanamine, butyroguanamine, or phenylacetoguanamine. The preferred compounds of component (a) include N-(methoxymethyl), N-(n-butoxymethyl), and N-(isobutoxymethyl) derivatives of urea, melamine, ethylene dicarbamate, 1,4-butylene dicarbamate, 4,5-dihydroxyimidazolidin-2-one (i.e., 1,2-dihydroxyethyleneurea), 5-hydroxyhexahydro-2H-pyrimidin-2-one (i.e., 2-hydroxypropyleneurea), imidazolidin-2-one (i.e., ethyleneurea), hexahydro-2H-pyrimidin-2-one (i.e., 1,3-propyleneurea), 4-hydroxy-5,5-dimethyl-6-isopropylhexahydro-2H-pyrimidin-2-one (i.e., 1-hydroxy-2,2-dimethyl-3-isopropylpropyleneurea), and 2-methoxyethyl carbamate.

The products of the present invention are suitable for use in a variety of coating applications. They may, for example, be dissolved in an organic solvent or a mixture of organic solvents and blended with pigments, coreactants or other polymerisable materials for use as paints or varnishes for wood or metals or as inks or varnishes for paper or card. Alternatively, they may, if desired, be mixed with pigments, fillers, polymerisable materials, or coreactants, ground to a fine powder, typically having a particle size within the range 0.015 to 500 μm, and used as powder coatings.

Suitable coreactants are compounds containing two or more free alcoholic hydroxyl groups per average molecule and may be any of those used conventionally with etherified aminoplast resins, including alkyds, polyesters, hydroxyl-containing epoxide resins, and hydroxyl-containing acrylic resins. There also may be used (although in general they are less preferred, being less reactive towards the advanced resins of this invention) resins containing two or more free carboxylic acid groups per average molecule. Yet further suitable coreactants comprise resins containing at least two carboxylic acid amide groups per average molecule, such as copolymers of styrene and/or (meth)acrylic acid esters with minor proportions of (meth)acrylamide as described in British Patent Specification No. 1,026,696.

The coatings may be applied by conventional means, and after allowing or causing any solvent to evaporate if necessary, they may be cured at room temperature or by heating, usually within the range 50° to 300° C., especially from 100° to 225° C., to give a coating having a very good gloss, color, hardness, and resistance to grease, staining, and detergents.

This invention therefore also provides a process for coating a surface which comprises applying to the surface an advanced resin prepared by the novel process, optionally with a compound containing at least two alcoholic hydroxy groups, carboxylic acid groups, or carboxylic acid amide groups per average molecule, and causing the resin to form a hard, cross-linked coating, especially by heating.

The invention is illustrated by the following Examples, in which all parts are by weight unless otherwise specified. Percentages are percentages of weight. Softening points are recorded as determined by means of a Kofler bench.

EXAMPLE I

I. Preparation of a methylated dimethylolhexahydro-2H-pyrimidin-2-one

A mixture of formalin (330 g; formaldehyde content 36.6%) and hexahydro-2H-pyrimidin-2-one (200 g) was adjusted to pH 8.4 with 4% aqueous sodium hydroxide solution (0.8 ml) and heated at 60° C. for 1 hour. Due to a Cannizzaro reaction the basicity of the mixture decreased. The pH was re-adjusted to 7.5 with aqueous sodium hydroxide solution (20%) and the solution was heated under water pump vacuum until the residue weighed 320 g. Methanol (640 g) was added, and the temperature of the solution was adjusted to 28° C. Concentrated hydrochloric acid (6.0 ml) was added, and the mixture was stirred at 32° C. for 1 hour. The solution was adjusted to pH 7.5–8.0 with 20% aqueous sodium hydroxide solution (10.5 ml) and then distilled under water pump vacuum until the temperature of the residue reached 120° C. The residue was filtered to remove sodium chloride. The filtrate comprised a methylated 1,3-dimethylolhexahydro-2H-pyrimidin-2-one (306 g), the degree of methylation being 100%. It was a white semi-solid.

II. Advancement

This resin (54.1 g) and benzoguanamine (27.1 g, i.e., 0.5 gram equiv. of guanamine residue per mole of the aminoplast) were stirred together at 100° C. for ¼ hour. Toluen-p-sulfonic acid (0.1 ml of a 50% solution in methanol) was added to adjust the mixture to pH 4 and heating was continued at 100° C. for a further 1¾ hours, all volatile materials being removed as they formed. A further quantity of toluene-p-sulfonic acid (0.1 ml of a 50% solution in methanol) was added and heating was continued at 100° C. for ¾ hour, at which time the product had a softening point of 62° C. The product was neutralised with N-benzyldimethylamine (0.17 ml) and poured into an aluminum tray.

EXAMPLE 2

I. Preparation of a methylated dimethylolimidazolidin-2-one

The procedure in the first part of Example 1 was repeated except that the hexahydro-2H-pyrimidin-2-one was replaced by imidazolidin-2-one (191.1 g; 90% pure). The methylated 1,3-dimethylolimidazolidin-2-one (degree of methylation 96%) remained as a liquid after filtration to remove sodium chloride.

II. Advancement

This liquid (87.0 g) was mixed with benzoguanamine (46.7 g, i.e., 0.5 gram-equiv. of guanamine residue per mol. of the aminoplast) and heated to 100° C. After 20 minutes, toluene-p-sulfonic acid (0.3 ml; 50% solution in methanol) was added, bringing the pH to 4, and heating was continued at 100° C. All volatile materials were removed as they formed. After 220 minutes the residue had a softening point of 69° C. It was neutralised with N-benzyldimethylamine (0.15 ml) and poured into an aluminum tray.

EXAMPLE 3

I. Preparation of a highly methylated dimethylol-4,5-dihydroxyimidazolidin-2-one The pH of a mixture of urea (240 g) and glyoxal (580 g; 40% aqueous solution) was adjusted to 7.0 with 20% aqueous sodium hydroxide solution (1.0 ml). The mixture was heated to 50° C. and kept at that temperature for 2 hours whilst the pH was maintained at 7.0 by the addition of aqueous sodium hydroxide solution as required. A solution of 4,5-dihydroxyimidazolidin-2-one was formed. Formalin (660 g; 36.6% formaldehyde) was added, and heating was continued at 70° C. for a further 2 hours at pH 7.0. The solution was cooled and distilled under water pump vacuum until the residue weighed 820 g. Methanol (1280 g) was added and the solution was cooled to 25° C. Concentrated hydrochloric acid (12.0 ml) was added and reaction was continued at 32° C. for 1 hour. The solution was adjusted to pH 7.5 with 20% aqueous sodium hydroxide solution (22.2 ml) and then distilled under water pump vacuum until the temperature of the residue reached 120° C. Salt was removed by filtration to leave a methylated 1,3-dimethylol-4,5-dihydroxyimidazolidin-2-one as a yellow viscous liquid. The degree of methylation was 99%.

II. Advancement

This liquid (90.6 g) was mixed with benzoguanamine (41.4 g, i.e., 0.5 gram-equiv. of guanamine residue per mole of the aminoplast) and toluene-p-sulfonic acid (0.4 ml of a 50% solution in methanol), and heated to 100° C. at pH 4 for 5 hours, all volatile materials being removed as they formed. The product, which had a softening point of 66° C., was poured into an aluminum tray and cooled.

EXAMPLE 4

I. Preparation of a methylated dimethylol-4-hydroxy-5,5-dimethyl-6-isopropylhexahydro-2H-pyrimidin-2-one Formalin (82.5 g, 36.6% formaldehyde) was adjusted to pH 8.4 with 4% aqueous sodium hydroxide solution (0.2 ml), 4-hydroxy-5,5-dimethyl-6-isopropylhexahydro-2H-pyrimidin-2-one (93 g) was added, and the mixture was heated to 60° C. for 1 hour and then at 80° C. for 4½ hours. The solution was distilled under water pump vacuum until the residue weighed 137 g. Methanol (160 g) was added, and the solution was cooled to 25° C. Concentrated hydrochloric acid (1.5 ml) was added, and the reaction was continued at 32° C. for 1 hour. The pH was adjusted to 8.0 with 20% aqueous sodium hydroxide solution (2.8 ml) and then the solution was distilled under water pump vacuum until the temperature of the residue reached 120° C. The residue was filtered to remove salt and allowed to cool: the 1,3-bis(methoxymethyl)-4-hydroxy-5,5-dimethyl-6-isopropylhexahydro-2H-pyrimidin-2-one slowly crystallised. Its degree of methylation was 95%.

II. Advancement 81.5 g of the above residue was mixed with benzoguanamine (27.8 g, i.e., 0.5 gram-equiv. of guanamine residue per mole of aminoplast) and a 50% solution in methanol of toluene-p-sulfonic acid (0.8 ml). The mixture was heated at 100° C. and pH 4 for 2½ hours and then at 120° C. for 3 hours, removing all volatiles as they formed. The product had a softening point of 70° C. N-Benzyldimethylamine (0.4 ml) was added, and the product was poured into an aluminum tray.

EXAMPLE 5

A highly methylated hexamethylolmelamine resin with degree of methylation 80% (56.1 g) was mixed with benzoguanamine (13.9 g, i.e., 0.5 gram-equiv. of guanamine residue per mole of aminoplast) and heated to 100° C. After 15 minutes a 50% solution of toluene-p-sulfonic acid in methanol (0.4 ml) was added, and heating was continued at pH 4 for a further 75 minutes, removing all volatiles as they formed. The residue in the flask then had a softening point of 60° C. A 50% solution in methanol of N-benzyldimethylamine (0.34 ml) was added, and the product was poured into an aluminum tray.

EXAMPLE 6

A highly methylated urea-formaldehyde resin of U:F molar ratio 1:3.0, degree of methylation 70%, (72.0 g) was mixed with 37.4 g of benzoguanamine (i.e., 0.5 gram-equiv. of guanamine residue per mole of aminoplast) and heated at 120° C. and at pH 7 for 20 minutes. The product had a softening point of 80° C.

EXAMPLE 7

Example 1 was repeated except that the benzoguanamine was replaced by 22.0 g of butyroguanamine (i.e., 0.5 gram-equiv. of guanamine residue per mole of aminoplast). Reaction was carried out at 100° C. and at pH 4 in the presence of a 50% solution in methanol of toluene-p-sulfonic acid (0.26 ml) for 6 hours. The product, which had a softening point of 70° C., was neutralised with N-benzyldimethylamine (0.26 ml).

EXAMPLE 8

Example 1 was repeated except that the benzoguanamine was replaced by 28.95 g of phenylacetoguanamine (i.e., 0.5 gram-equiv. of guanamine residue per mole of aminoplast). The reaction was carried out at 120° C. and at pH 4 in the presence of a 50% solution in methanol of toluene-p-sulfonic acid (0.28 ml) for 1½ hours. The product, which had a softening point of 72° C., was neutralised with N-benzyldimethylamine (0.28 ml).

EXAMPLE 9

Example 1 was repeated except that the benzoguanamine was replaced by 17.96 g of acetoguanamine (i.e., 0.5 gram-equiv. of guanamine residue per mole of aminoplast). The reaction was carried out at pH 3.5 in the presence of a 50% solution in methanol of toluene-p-sulfonic acid (0.46 ml) and at 120° C. for 10 hours followed by a further 20 hours at 150° C. The product, which had a softening point of 75° C., was neutralised with N-benzyldimethylamine (0.23 ml).

EXAMPLE 10

Example 1 was repeated except that the benzoguanamine was replaced by 33.82 g of caprinoguanamine (i.e., 0.5 gram-equiv. of guanamine residue per mole of aminoplast). The reaction was carried out at 120° C. and at pH 4 in the presence of a 50% solution in methanol of toluene-p-sulfonic acid (0.30 ml) for 3¼ hours. The product, which had a softening point of 58° C., was neutralised with N-benzyldimethylamine (0.30 ml).

EXAMPLE 11

Example 6 was repeated except that the benzoguanamine was replaced by 12.5 g of acetoguanamine (i.e., 0.25 gram-equiv. of guanamine residue per mole of aminoplast). The mixture was heated at 120° C. for 1½ hours. The product had a softening point of 50° C.

EXAMPLE 12

I. Preparation of n-butylated dimethylolhexahydro-2H-pyrimidin-2-one

To a mixture of 1,3-dimethylolhexahydro-2H-pyrimidin-2-one (160 g) and n-butanol (444 g) at 30° C. was added concentrated hydrochloric acid (10 ml). Mixing was continued for 2 hours at 30° C., the solution was adjusted at pH 8.8 with 20% aqueous sodium hydroxide solution (19.5 ml), and then distilled under water pump vacuum until the temperature of the residue reached 110° C. The residue was filtered to remove sodium chloride. The filtrate, an n-butylated 1,3-dimethylolhexahydro-2H-pyrimidin-2-one (229 g), was a pale yellow liquid with degree of butylation 62%.

II. Advancement

This liquid (65.4 g) and benzoguanamine (26.7 g, i.e., 0.5 gram-equiv. of guanamine residue per mole of the aminoplast) were stirred together at 120° C. and at pH 4.5 in the presence of a 50% solution in methanol of toluene-p-sulfonic acid (0.2 ml) for 1½ hours, and then at 135° C. for 1 hour. The product, which had a softening point of 120° C., was neutralised with N-benzyldimethylamine (0.1 ml).

EXAMPLE 13

Example 12 was repeated except that the benzoguanamine was replaced by 8.92 g of acetoguanamine (i.e., 0.25 gram-equiv. of guanamine residue per mole of the aminoplast). The reaction was carried out at 120° C. in the presence of a 50% solution in methanol of toluene-p-sulfonic acid (0.14 ml) for 1 hour, then at 140° C. for 1 hour, and finally, after addition of a further 0.14 ml of the toluene-p-sulfonic acid solution, at 150° C. for 10 hours. The product, which had a softening point of 40° C., was neutralised with N-benzyldimethylamine (0.14 ml).

EXAMPLE 14

A commercially-available, highly n-butylated urea-formaldehyde resin, of resin-forming solids content 60% (112.5 g) was mixed with 35.1 g of benzoguanamine (i.e., approximately 0.5 gram-equiv. of guanamine residue per mole of aminoplast), and heated to 110° C. n-Butanol was removed by slowly applying water pump vacuum over 2 hours. The product had a softening point of 120° C.

EXAMPLE 15

I. Preparation of a methylated N,N-dimethylol-2-methoxyethyl carbamate

A mixture of formalin (410 g; 36.6% formaldehyde) and 2-methoxyethyl carbamate (238 g) was adjusted to pH 10.0 with 20% aqueous sodium hydroxide solution (1.5 ml) and heated at 70° C. for 5 hours The pH was kept at 10.0 by addition of the 20% aqueous sodium hydroxide solution as necessary. Methanol (640 g) was added, and the solution was cooled to 25° C. Concentrated hydrochloric acid (10 ml) was added, and reaction was continued at 32° C. for 1 hour. The pH of the solution was adjusted to 8.8 with 18 ml of 20% aqueous sodium hydroxide solution, and then the mixture was distilled under water pump vacuum until the temperature of the residue reached 120° C. The residue was filtered to leave a yellow liquid which was a methylated N,N-dimethylol-2-methoxyethyl carbamate with a degree of methylation of 68%.

II. Advancement

This liquid (74.0 g) and 18.7 g of benzoguanamine (i.e., 0.5 gram-equiv. of guanamine residue per mole of aminoplast) were stirred together at 110° C. in the presence of a 50% solution in methanol of toluene-p-sulfonic acid (0.5 ml) for 5½ hours, and then at 150° C. for 15 hours. The product, which had a softening point of 40° C., was neutralised with N-benzyldimethylamine (0.50 ml).

EXAMPLE 16

The product of each of Examples 1 to 3 was mixed with a commercially-available solid epoxy resin having an epoxy value of 1.25 equiv./kg at a ratio of advanced aminoplast:epoxy resin of 80:20. For ease of application the mixtures were dissolved in xylene/n-butanol/dimethylformamide (1:1:1 by volume) to give a 50% solution. The solutions were applied by means of a wire-wound rod to glass or metal plates to give a wet coating 75 μm thick. The coatings were cured for 15 minutes at 200° C. After the coatings had been conditioned overnight at 65% relative humidity and 15.5° C., their hardness was measured in seconds using a Persoz pendulum according to ISO 1522-1973 e (International Standard Organisation) and they were tested for resistance to acetone or xylene by rubbing 20 times with a swab of cotton wool soaked in the appropriate solvent. The results are recorded in Table I.

TABLE I

| Product of Example | Hardness sec. | Acetone resistance | Xylene resistance |
|---|---|---|---|
| 1 | 329 | slightly softened | very slightly softened |
| 2 | 363 | slightly softened | very slightly softened |
| 3 | 405 | slightly softened | very slightly softened |

EXAMPLE 17

Example 16 was repeated except that the epoxy resin was replaced by "Polyester A", a solid, hydroxyl-containing polyester resin of hydroxyl value 3.4 mol/kg, prepared by conventional means from dimethyl terephthalate, 1,4-cyclohexanedimethanol, neopentyl glycol, and trimethylolpropane (4:1:2:2 mol.) The product of each of Examples 1 to 3 was mixed with the polyester at ratios of advanced aminoplast:polyester of 30:70 or 80:20. The results are recorded in Table II.

TABLE II

| Product of Example | Ratio (Advanced Aminoplast: Polyester A) | Hardness sec. | Acetone Resistance | Xylene resistance |
|---|---|---|---|---|
| 1 | 30:70 | 339 | partially removed | slightly softened |
| 1 | 80:20 | 348 | no effect | no effect |
| 2 | 30:70 | 312 | very slightly softened | no effect |
| 2 | 80:20 | 368 | no effect | no effect |
| 3 | 30:70 | 352 | partially removed | slightly softened |
| 3 | 80:20 | 368 | slightly softened | no effect |

EXAMPLE 18

Example 16 was repeated, the epoxy resin being replaced by a commercially-available, hydroxyl-containing acrylic resin. The product of each of Examples 1 to 3 was mixed with the acrylic resin at a ratio of advanced aminoplast:acrylic resin of 80:20. "Flexibility" was determined by bending the panel around mandrels of decreasing diameter and noting the smallest diameter (in mm) around which the panel could be bent without the coating cracking or just beginning to crack according to British Standard 3900 part E 1 using type 1 apparatus. The results are recorded in Table III

TABLE III

| Product of Example | Hardness sec. | Flexibility (Mandrel bend) | Acetone Resistance | Xylene Resistance |
|---|---|---|---|---|
| 1 | 324 | 13 mm pass | no effect | no effect |
| 2 | 297 | 9 mm pass | slightly softened | very slightly softened |
| 3 | 305 | 8 mm pass | slightly softened | very slightly softened |

EXAMPLE 19

Example 16 was repeated except that the products of Examples 1 to 3 were replaced by the product of each of Examples 4 and 6-14. The results are recorded in Table IV.

TABLE IV

| Product of Example | Hardness sec. | Acetone resistance | Xylene resistance |
|---|---|---|---|
| 4 | 359 | removed | softened |
| 6 | 343 | no effect | no effect |
| 7 | 369 | slightly softened | no effect |
| 8 | 361 | no effect | no effect |
| 9 | 339 | slightly softened | very slightly softened |
| 10 | 344 | no effect | no effect |
| 11 | 305 | no effect | no effect |
| 12 | 318 | slightly softened | very slightly softened |
| 13 | 297 | no effect | no effect |
| 14 | 309 | very slightly softened | no effect |

EXAMPLE 20

Example 17 was repeated except that the products of Examples 1 to 3 were replaced by the product of Examples 6 to 15 and a ratio of 80:20 of advanced aminoplast-:polyester was employed. Further the "flexibility" was determined as described in Example 18. The results are recorded in Table V.

TABLE V

| Product of Example | Hardness sec. | Flexibility (Mandrel bend) | Acetone resistance | Xylene resistance |
|---|---|---|---|---|
| 6 | 343 | 13 mm fail | no effect | no effect |
| 7 | 346 | 6.4 mm pass | no effect | no effect |
| 8 | 356 | 3.2 mm pass | no effect | no effect |
| 9 | 335 | 13 mm pass | no effect | no effect |
| 10 | 337 | 1.6 mm pass | no effect | no effect |
| 11 | 307 | 13 mm fail | no effect | no effect |
| 12 | 331 | 8.0 mm pass | no effect | no effect |
| 13 | 303 | 1.6 mm pass | no effect | no effect |
| 14 | 296 | 13 mm fail | no effect | no effect |
| 15 | 273 | 13 mm fail | softened | slightly softened |

EXAMPLE 21

Example 18 was repeated except that the products of Examples 1 to 3 were replaced by the products of Examples 6 to 14. The results are recorded in Table VI.

TABLE VI

| Product of Example | Hardness sec. | Flexibility (Mandrel bend) | Acetone Resistance | Xylene Resistance |
|---|---|---|---|---|
| 6 | 314 | 13 mm fail | no effect | no effect |
| 7 | 320 | 8 mm pass | no effect | no effect |
| 8 | 310 | 6.4 mm pass | no effect | no effect |
| 9 | 320 | 13 mm fail | softened | softened |
| 10 | 320 | 1.6 mm pass | no effect | no effect |
| 11 | 303 | 6.4 mm pass | slightly softened | softened |
| 12 | 267 | 6.4 mm pass | no effect | no effect |
| 13 | 292 | 1.6 mm pass | no effect | no effect |
| 14 | 265 | 13 mm fail | no effect | no effect |

EXAMPLE 22

Example 17 was repeated except that products of Examples 1 to 3 were replaced by the product of Example 5, and the ratio of advanced aminoplast to polyester was 1 to 1. The cured coating had a hardness of 341 seconds (Persoz) and was unaffected by rubbing with acetone or xylene.

EXAMPLE 23

A powder coating composition was prepared containing the product of Example 10 and, as coreactant, Polyester B, which denotes a commercially-available, saturated, oil-free, alcoholic hydroxyl group-containing branched polyester (supplied under the designation "Uralac P 2504" by Synthetic Resins Limited, Speke, Liverpool, England: "Uralac" is a trademark). Polyester B had an acid value (measured according to ISO 2114) of less than 10 mg KOH/g and a hydroxyl value (measured according to ASTM D 1544-68) of 30–40 mg KOH/g.

The following components were mixed by dry blending followed by hot-melt extrusion in a Buss Ko-Kneader using a barrel temperature of 95° C. and a screw temperature of 40° C., cooling the extrudate to room temperature, and crushing and grinding to a particle size below 75 μm ("Ko-Kneader" is a trademark). The bulk of the material had a particle size between 20 and 75 μm:

| | |
|---|---|
| Product of Example 10 | 145 parts |
| Polyester B | 145 parts |
| Polyacrylic resin (a commercially-available flow additive) | 5 parts |
| Benzoin (levelling agent) | 3 parts |
| Titanium dioxide | 200 parts |

The mixtures were sprayed onto steel panels and onto chromate-treated aluminum panels using an electrostatic powder sprayer, and cured by heating for 15 minutes at 200° C., giving coatings 50 μm thick. These coatings were then tested as follows:

Resistance to ethyl methyl ketone was determined by giving the panel 20 double rubs with a cotton wool swab soaked in ethyl methyl ketone "Gloss" was determined by the method of BS 3900 Part D2 (1967) using a 60° angle of incidence "Flexibility" was determined by bending the panel around a mandrel of 12 mm diameter and noting the angle through which the panels could be bent without cracking the coating.

| | |
|---|---|
| Ethyl methyl ketone resistance | passed |
| % Gloss | 43 |
| Flexibility | 120° |

What is claimed is:

1. A process for the preparation of an advanced etherified aminoplast resin which comprises
   reacting, at a pH of from 2.5 to 9 and at a temperature in the range 80° to 150° C.,
   (a) an etherified N-methylolated urea, cyclic urea, carbamate, or melamine, having the formula I, II, or III $$ROCH_2N(R^2)-R^1-N(R^3)CH_2OR \qquad \text{I}$$

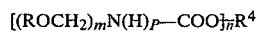

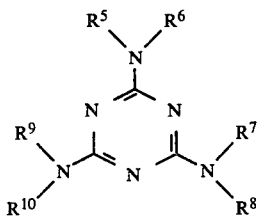

where

R represents a hydrogen atom or an alkyl group of 1 to 6 carbon atoms, with the proviso that at least 50% of the symbols R in the groups —CH$_2$OR in every compound of formula I, II, and III represent such alkyl groups, R$^1$ represents a carbonyl group, in which case R$^2$ and Rhu 3 (which may be the same or different) each represents a hydrogen atom or a group of formula ROCH$_2$—, or together they represent an alkylene chain of 2 to 4 carbon atoms which may be substituted by 1 or 2 hydroxyl groups and by 1 to 4 alkyl groups each of up to 5 carbon atoms, or R$^1$ represents a methylene or ethylene group, in which case R$^2$ and R$^3$ each represents a group of formula —COOR$^{11}$, n either represents 1, in which case p represents zero, m represents 2, and R$^4$ represents an alkyl group of 1 to 18 carbon atoms which may be substituted by 1 or 2 hydroxyl groups or by an alkoxy group of from 1 to 5 carbon atoms, or n represents 2, in which case p represents zero and m represents 2, or p and m each represents 1, and R$^4$ represents an alkylene group of 1 to 6 carbon atoms or an arylene group of 6 to 12 carbon atoms, R$^5$ to R$^{10}$, which may be the same or different, each represents a hydrogen atom or a group of formula —CH$_2$OR, with the proviso that not more than 4 of them represent hydrogen atoms, and R$^{11}$ represents an alkyl group of up to 18 carbon atoms which may be substituted by 1 or 2 hydroxyl groups or by an alkoxy group of from 1 to 5 carbon atoms, with (b) a guanamine of formula

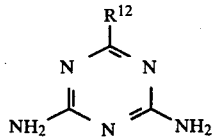

where

R$^{12}$ represents an alkyl or aralkyl group of from 1 to 18 carbon atoms, an aryl group of 6 to 8 carbon atoms,
or a group of formula

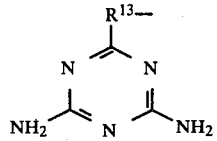

and R$^{13}$ represents an alkylene group of from 2 to 16 carbon atoms or a phenylene group, wherein 0.05 to 1 gram equivalent of guanamine residue of component (b) is used per mole of component (a).

2. The process of claim 1, which is effected at a pH in the range 3 to 6.

3. The process of claim 1, in which 0.1 to 0.7 gram equivalent of guanamine residue of component (b) is used per mole of component (a).

4. The process of claim 1, in which the reaction mixture is heated at a temperature in the range 80° to 140° C. for from 2 to 6 hours.

5. The process of claim 1, in which component (a) is an N-(methoxymethyl), N-(n-butoxymethyl), or N-(isobutoxymethyl) derivative of urea, melamine, ethylene dicarbamate, 1,4-butylene dicarbamate, 4,5-dihydroxyimidazolidin-2-one, 5-hydroxyhexahydro-2H-pyrimidin-2-one, imidazolidin-2-one, hexahydro-2H-pyrimidin-2-one, 4-hydroxy-5,5-dimethyl-6-isopropyl-hexahydro-2H-pyrimidin-2-one, or 2-methoxyethyl carbamate.

6. The process of claim 1, wherein component (b) is caprinoguanamine, benzoguanamine, acetoguanamine, butyroguanamine, phenylacetoguanamine, adipoguanamine or succinoguanamine.

7. An advanced, etherified aminoplast resin, obtained by the process of claim 1, which has a softening point within the range 60° to 120° C.

8. A process for coating a surface which comprises applying thereto an advanced resin obtained by the process of claim 1 and heating it to form a hard, crosslinked coating.

9. A process of claim 8 wherein the said advanced resin is heated in the presence of a coreactant resin, containing per average molecule at least two free alcoholic hydroxyl groups, two free carboxylic acid groups or two free carboxylic acid amide groups, said resin being selected from the group consisting of hydroxyl-containing polyester resins, hydroxyl-containing epoxide resins, hydroxyl-containing acrylic resins, carboxy-containing resins, and copolymers of styrene, acrylic acid esters or methacrylic acid esters with minor proportions of acrylamide or methacrylamide.

* * * * *